United States Patent [19]

Koveal, Jr. et al.

[11] Patent Number: 6,063,349

[45] Date of Patent: May 16, 2000

[54] REMOVAL OF HYDROGEN CYANIDE FROM SYNTHESIS GAS

[75] Inventors: Russell J. Koveal, Jr., Baton Rouge; Keith E. Corkern, Denham Springs, both of La.

[73] Assignee: Exxon Research and Engineering Company, Florham Park, N.Y.

[21] Appl. No.: 08/929,315

[22] Filed: Sep. 19, 1997

Related U.S. Application Data

[63] Continuation-in-part of application No. 08/512,734, Aug. 8, 1995, abandoned.

[51] Int. Cl.[7] ................................ C07C 1/02; C10K 1/34
[52] U.S. Cl. ............................................. 423/236; 518/705
[58] Field of Search ............................. 423/236; 518/705

[56] References Cited

U.S. PATENT DOCUMENTS

| | | | |
|---|---|---|---|
| 4,271,133 | 6/1981 | Tellis | 423/236 |
| 4,769,224 | 9/1988 | Grinsven | 423/236 |
| 4,810,475 | 3/1989 | Chu | 423/236 |
| 5,068,254 | 11/1991 | Posthuma | 518/705 |
| 5,173,278 | 12/1992 | Marler | 423/236 |
| 5,466,427 | 11/1995 | Rumpf | 423/236 |
| 5,486,313 | 1/1996 | De Jong | 252/373 |
| 5,660,807 | 8/1997 | Foerg | 423/236 |

FOREIGN PATENT DOCUMENTS

| | | | |
|---|---|---|---|
| 2157542 | 3/1996 | Canada | 21/6 |
| 049394 | 4/1982 | European Pat. Off. | 423/236 |
| 0757969 | 2/1997 | European Pat. Off. | 3/58 |
| 4424695 | 1/1995 | Germany | 23/88 |

OTHER PUBLICATIONS

Cotton, F., et al. "Advanced Inorganic Chemistry", 4th Edition. Wiley & Sons: New York, p. 847, 1980.

*Primary Examiner*—Tom Dunn
*Assistant Examiner*—Peter DiMauro
*Attorney, Agent, or Firm*—Jay Simon; Jonathan N. Provoost

[57] ABSTRACT

The HCN concentration of HCN containing synthesis gas streams is reduced by treatment with a Group IVA metal oxide and optionally containing a Group IIB, Group VA, or Group VIA metal or metals, at reaction conditions preferably suppressing Fischer-Tropsch activity.

12 Claims, No Drawings

REMOVAL OF HYDROGEN CYANIDE FROM SYNTHESIS GAS

CROSS REFERENCE TO RELATED APPLICATIONS

Continuation-in-Part of U.S. Ser. No. 08/512,734, filed Aug. 8, 1995, now abandoned, (based on PM 93BR 129)

FIELD OF THE INVENTION

Hydrogen cyanide, HCN, is a poison, some times reversibly so, for Fischer-Tropsch hydrocarbon synthesis processes. This invention relates to a process for the removal of HCN from synthesis gas feeds to Fischer-Tropsch processes.

BACKGROUND OF THE INVENTION

Synthesis gas, hydrogen and carbon monoxide, useful as feed to Fischer-Tropsch processes is often formed by steam reforming or partial oxidation of materials such as methane, natural gas, lower hydrocarbons, coal, and the like all of which often contain nitrogen in various forms. Oxygen, as such, or air can be used in either process can also lead to the presence of nitrogen in the feed to the synthesis gas plant. The presence of nitrogen in the feeds to a synthesis gas generation process often results in HCN in the synthesis gas product. (Air plants for the separation of oxygen and nitrogen are not 100% efficient.) HCN is a poison for Fischer-Tropsch processes, particularly those utilizing Group VIII metal catalysts. Catalyst activity is thus reduced, and while activity may be regained by hydrogen treatment, the interruption of the process and treatment step are economic debits for the process.

While processes exist for HCN removal, these processes are not generally capable of removing the 90+% of HCN necessary for viable Fischer-Tropsch processing and do not operate at the relatively low Fischer-Tropsch reaction temperatures, also resulting in economic debits for the process. Also, HCN is only weakly soluble in water or normal solvents and water scrubbing or gas scrubbing of the HCN containing synthesis gas is not adequate for further use of the gas in Fischer-Tropsch synthesis.

SUMMARY OF THE INVENTION

In accordance with this invention, HCN is substantially completely removed, e.g., at least about 90% removed, from HCN containing synthesis gas by passing, preferably in the presence of water, e.g., vapor, the gas stream in contact with a Group IVA metal oxide, preferably titania. In so doing, HCN can be removed at 90+% levels, preferably at least about 95% removal, and more preferably at least about 99% HCN removal.

The Group IVA metal oxides, titania, hafnia, and zirconia, may be promoted by metals selected from the group consisting of Group IIA, Group VB, and Group VIA metals or mixtures thereof. Particularly preferred metals are those of Group IIB, most preferably zinc, and Group VIA, most preferably molybdenum. HCN removal from the synthesis gas is believed to be effected by hydrolysis in the case of unpromoted materials and by a combination of hydrolysis and hydrogenation in the case of promoted materials.

While the HCN removal process may be conducted at various operating conditions, temperatures are at least about 140° C., preferably at least about 150° C. to about 400° C., still more preferably about 150° C. to about 350° C.

Pressures may vary between about 1–100 bar, preferably 10–40 bar. Both temperatures and pressure are selected to maximize HCN removal and minimize reheating, and compression of the synthesis gas before entering the Fischer-Tropsch reaction.

The HCN removal process is generally carried out in the substantial absence of sulfur or sulfur containing compound, e.g., no more than about 10 ppm sulfur, preferably no more than about 5 ppm sulfur, more preferably no more than about 1 ppm sulfur, and still more preferably no more than about 50 ppb sulfur.

DESCRIPTION OF PREFERRED EMBODIMENTS

Decreasing the concentration of HCN in HCN containing synthesis gas can be effected with Group IVA metal oxides alone or composited with other essentially inert materials, e.g., alumina or silica. However, the Group IVA metal oxide, preferably titania should be present in any composite to the extent of at least about 50 wt %, preferably at least about 75 wt %, and more preferably at least about 80 wt %. The surface area of the material should be at least about 150 $m^2/gm$ (BET method), with a bulk density of at least about 0.2 gm/cc. More preferably, the HCN removal process is effected in the substantial absence of Group VIII metals or compounds thereof.

Promoter metals can be added to the metal oxide by conventional methods, e.g., kneading, spray drying, impregnation, preferably by the incipient wetness impregnation technique where the promoter metals are added as a soluble aqueous salt, e.g., ammonium heptomolybdate, zinc nitrate (preferably not halide salts). Following impregnation, the material is dried, e.g., at about 100–150° C., preferably under vacuum, followed by calcination at temperatures of about 350° C. or higher, e.g., 350–550° C., to convert the salt to the oxide form. The oxide is then activated by treatment with a reducing gas, e.g., hydrogen or a hydrogen containing gas on a hydrogen containing synthesis gas (activation may occur in situ), at temperatures of at least about 175° C., preferably 200° C., more preferably at least about 225° C. and in a range of 225° C. to about 350° C.; and pressures of about 1–100 bar, preferably 10–40 bar. Consequently, at least a portion of the promoter oxide is in a lower valence state, e.g., at least a portion of the molybdenum oxide has the molybdenum in a valence state of less than +6. Nevertheless, the elemental form of the metal is generally not produced, i.e., $\leq 0.1$ wt % elemental metal is present.

The amount of promoter may vary widely and is necessary in amounts at least sufficient to provide an increase in HCN removal over and above that obtained with the Group IVA metal oxide alone. Preferably, promoters are present in amounts of about 1–30% by weight, preferably 2–30% by weight, more preferably about 5–30 wt %. Promoters, may be selected from Group IIB of the Periodic Chart of the Elements, e.g., zinc, cadmium, mercury; Group VB, e.g., vanadium, niobium, tantalum; Group VIB, e.g., chromium, molybdenum, tungsten, or mixtures of any one or more thereof. Preferred promoters are zinc and molybdenum, most preferably molybdenum.

The hydrolyzed or hydrogenated HCN can be removed from the synthesis gas by any applicable method well known to those skilled in the art, e.g., water scrubbing or absorption onto a solid absorbent. The synthesis gas is then passed to a Fischer-Tropsch hydrocarbon synthesis process at temperatures of about 175° C., preferably 180° C. to about 400° C. and pressures of about 1–100 bar, preferably 10–40 bar. Fischer-Tropsch catalysts can be Group VIII metals either bulk or in supported form. The metals may be iron, nickel, cobalt, or ruthenium, preferably cobalt or ruthenium or both, more preferably cobalt, and the support may be any carrier, e.g., silica, alumina, silica-alumina, titania, preferably silica or titania. Promoters may be employed, preferably zirconium or titanium with silica supports and rhenium or hafnium with titania supports. The Fischer-Tropsch process produces $C_2+$ materials, preferably $C_5+$ materials. Binders for support, depending on the mode of the process may be employed as necessary.

The following examples will further serve to illustrate this invention but are not meant to be limiting in any way.

A titania support material was used in each of the following examples, unless otherwise specified, and had the nominal composition and physical properties shown in Table I.

TABLE I

| | |
|---|---|
| $TiO_2$ | 81.6 wt % |
| $Na_2O$ | 6.7 |
| MgO | 4.7 |
| $Al_2O_3$ | 0.95 |
| $SO_3$ | 3.3 |
| surface area | 200 $m^2/gm$ |
| bulk density | 50 $lbs/ft^3$ |

A simulated HCN containing synthesis gas having the nominal composition shown in Table II was used for demonstrating HCN removal.

TABLE II

| | |
|---|---|
| Hydrogen | 55.1 vol % |
| Carbon Monoxide | 22.3 |
| Carbon Dioxide | 3.2 |
| Water Vapor | 11.1 |
| Argon | 8.3 |
| HCN | 215 ppmv |

HCN removal tests were run at a GHSV of 11,500 and 22 bar unless otherwise specified.

EXAMPLE 1

Table III shows the results of several tests for HCN removal using Various promoter oxides and unpromoted material.

TABLE III

| Material | 343° C. (650° F.) | 288° C. (550° F.) | 232° C. (450° F.) | 177° C. (350° F.) | 149° C. (300° F.) |
|---|---|---|---|---|---|
| $TiO_2$ (from Table I) | >99 | >99 | 96 | 82 | 67 |
| 5 wt % $Mo/TiO_2$ | >99 | >99 | >99 | 99 | 96 |
| 5 wt % $Zn/TiO_2$ | 99 | 99 | 99 | 95 | 79 |
| 5 wt % Mo/5 wt % $Zn/TiO_2$ | >99 | >99 | >99 | >99 | 94 |

The results of Table III show that all materials tested were adequate for removing 90+% HCN from the synthesis gas. However, as process temperature was reduced the ability of $TiO_2$ to remove HCN fell off significantly and at 300° F. only Mo or Zn promoted $TiO_2$ could remove 90+% of the HCN.

EXAMPLE 2

Activation of the promoted oxide material can effect the HCN removal ability of the material. Table IV below shows activation with a hydrogen containing gas at temperatures shown for a 5% by weight molybdenum oxide/$TiO_2$ material.

TABLE IV

| | % HCN Removal At | | |
|---|---|---|---|
| Activation Temperature | 177° C. (350° F.) | 163° C. (325° F.) | 149° C. (300° F.) |
| 177° C. (350° F.) | 96.6 | 95.1 | — |
| 204° C. (400° F.) | 97.8 | 94.4 | 88.3 |
| 232° C. (450° F.) | 99.9 | 99.4 | 97.1 |
| 288° C. (550° F.) | 99.9 | 99.9 | 97.9 |
| 343° C. (650° F.) | 99.9 | 100.0 | 98.7 |

Clearly, as processing temperature increases, activation temperature achieving a particular degree of HCN removal.

To achieve 90+% HCN removal an activation temperature of at least about 232 C. (450° F.) is necessary.

EXAMPLE 3

Experiments, Table V, were conducted to determine optimum loadings for Mo oxide promoter for HCN removal. Activation was conducted at 288° C. (550° F.), 39,000 GHSV, 22 bar (320 psig) for 5.5 hours with the synthesis gas blend with HCN. HCN removal was effected at the temperatures shown with 200 ppm HCN in the synthesis gas and pressure and GHSV the same as the activation conditions.

TABLE V

| Mo wt % | 177° C. (350° F.) | 163° C. (325° F.) | 149° C. (300° F.) |
|---|---|---|---|
| 30 | 99.03 | 94.8 | 84.8 |
| 20 | 99.6 | 95.8 | 86.4 |
| 15 | 98.1 | 93.8 | 82.4 |
| 10 | 97.9 | 90.5 | NA |
| 5 | 95.0 | 87.2 | 69.9 |
| 2.5 | 79.9 | 53.5 | 42.1 |
| 0 | 51.9 | 49.5 | 38.2 |

Optimum Mo oxide loading for achieving 90+%, 95+%, or 99+% HCN removal depends on processing temperature. Nevertheless, loading is preferably at least about 5%, more preferably at least about 10%, still more preferably at least 20%, a range of 5–30% covering most optimum conditions.

EXAMPLE 4

Table VI below shows the effect of surface and bulk density of various titania materials from different suppliers. Conditions were the same as for the molybdenum loading tests.

TABLE VI

| | % HCN Removal At | | | Surface | Bulk |
|---|---|---|---|---|---|
| | 177° C. (350° F.) | 163° C. (325° F.) | 149° C. (300° F.) | Area ($m^2/gm$) | Density (gm/cc) |
| Supplier A | 57.9 | 51.6 | NA | 50 | — |
| Supplier B | 86.4 | 78.2 | 60.7 | 250 | .16 |
| Supplier C | 95.0 | 87.2 | 69.9 | 250 | .22–.25 |

Table VI shows that a slightly higher bulk density material removes a greater proportion of the HCN.

In tests conducted with $Mo/TiO_2$ or $Zn/TiO_2$, no hydrocarbon synthesis was effected.

Under the conditions of this process Fischer-Tropsch synthesis will not generally occur since the oxide form of the metal promoters are not generally known as Fischer-Tropsch catalysts.

We claim:

1. A process for decreasing the HCN concentration of an HCN containing feed gas for use as a feed in a Fischer-Tropsch process and containing less than 5 ppm sulfur comprising pretreating a catalyst with a hydrogen or a hydrogen containing gas at a temperature of at least about 232° C. wherein said catalyst comprises a metal oxide support selected from the group consisting of titania, hafnia, zirconia and mixtures thereof, the metal oxide being promoted by an oxide selected from the group consisting of zinc, molybdenum, niobium and mixtures thereof, followed by passing the HCN containing feed gas in contact with said catalyst at a temperature from about 140° C. to no higher than 177° C.

2. The process of claim 1 wherein the gas is a synthesis gas comprising hydrogen and carbon monoxide.

3. The process of claim 2 wherein the process is conducted in the presence of water vapor.

4. The process of claim 3 wherein the promoter oxide is an oxide of molybdenum or zinc or a mixture thereof.

5. The process of claim 4 wherein the promoter oxide is molybdenum oxide.

6. The process of claim 3 wherein the promoter oxide is present in an amount of at least about 5 wt %.

7. The process of claim 4 wherein the support is titania.

8. The process of claim 4 wherein the HCN removal from the HCN containing gas is at least about 95% at a temperature no higher than 177° C. and a space velocity at least about 10,000/hr.

9. The process of claim 4 wherein the process is conducted in the substantial absence of Group VIII metals or the compounds thereof.

10. The process of claim 4 wherein the HCN containing feed gas contains no more than about 10 ppm sulfur or sulfur containing compounds.

11. The process of claim 4 wherein the recovered gas of reduced HCN concentration is employed as a feed to a Fischer-Tropsch process.

12. The process of claim 4 wherein said catalyst has a surface area of at least about 150 $m^2/gm$.

* * * * *